(12) United States Patent
Kato et al.

(10) Patent No.: US 7,125,041 B2
(45) Date of Patent: Oct. 24, 2006

(54) GAS GENERATOR

(75) Inventors: Kazuhiro Kato, Hyogo (JP); Shingo Oda, Himeji (JP); Hiroshi Harada, Himeji (JP); Ryohei Yamada, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 248 days.

(21) Appl. No.: 10/754,613

(22) Filed: Jan. 12, 2004

(65) Prior Publication Data

US 2004/0245753 A1 Dec. 9, 2004

Related U.S. Application Data

(60) Provisional application No. 60/441,163, filed on Jan. 21, 2003.

(30) Foreign Application Priority Data

Jan. 15, 2003 (JP) ............................. 2003-006544

(51) Int. Cl.
 *B60R 21/26* (2006.01)
(52) U.S. Cl. .................... 280/736; 280/741; 102/202; 102/202.1; 102/202.7; 102/530; 102/531
(58) Field of Classification Search ............... 280/736, 280/741; 102/530, 531, 202.1, 202.7
See application file for complete search history.

(56) References Cited

U.S. PATENT DOCUMENTS 6,053,531 A * 4/2000 Katsuda et al. ............. 280/741
6,648,370 B1 * 11/2003 Koga et al. ................. 280/736
6,718,884 B1 * 4/2004 Yabuta et al. ............... 102/530
6,796,245 B1 * 9/2004 Parker et al. ............... 102/530
6,796,579 B1 * 9/2004 Tanaka ....................... 280/736
2002/0135172 A1 * 9/2002 Koga .......................... 280/741

FOREIGN PATENT DOCUMENTS

| JP | 2001-97176 A | 4/2001 |
| JP | 2001-106017 A | 4/2001 |
| JP | 2002-172996 A | 6/2002 |
| JP | 2002-239371 A | 8/2002 |
| JP | 2002-346371 A | 12/2002 |

* cited by examiner

*Primary Examiner*—Paul N. Dickson
*Assistant Examiner*—Toan C. To
(74) *Attorney, Agent, or Firm*—Birch, Stewart, Kolasch & Birch, LLP

(57) ABSTRACT

An igniter includes: an igniter assembly including an igniter main body having an ignition portion adapted to be ignited by an ignition electric current; an igniter collar which accommodates the igniter main body; a cup body having an opening portion, the igniter assembly and the cup body being connected to each other, such that at least the ignition portion of the igniter main body is surrounded by the cup body; and a tubular crimp case that connects and fastens at least a part of an exterior surface of the igniter collar and at least a part of an exterior surface of the cup body from an outside.

16 Claims, 4 Drawing Sheets

GAS GENERATOR

This Nonprovisional application claims priority under 35 U.S.C. §119(e) on U.S. Provisional Application No. 60/441,163 filed on Jan. 21, 2003 and under 35 U.S.C. §119(a) on Patent Application No. 2003-6544 filed in Japan on Jan. 15, 2003, the entire contents of which are hereby incorporated by reference.

FIELD OF THE INVENTION

The present invention relates to a gas generator suitable for a pretensioner of a seat belt of a car, and also applicable as an electric igniter of a gas generator for an air bag used in a vehicle occupant-restraint apparatus in a vehicle.

BACKGROUND OF THE INVENTION

A seat belt is installed in a car in order to protect a vehicle occupant from the impact produced in a crash. And there are seat belts in which a gas generator for a pretensioner is installed as a means to protect a vehicle occupant in a crash of a car by tightening a seat belt. In addition, as an igniter of a gas generator for an air bag, an electric type igniter is known. As such prior arts, the followings are known.

In JP-A 2002-239371, a gas generator comprising a cup body 3 loaded with a gas generating agent, a igniter 5, and a holder 6 into which the cup body 3 and the igniter 5 are embedded and which contains the gas generating agent in the cup body 3 is disclosed. The cup body 3 and the holder 6 are connected by a reinforcing member 7 interposed in an exterior circumferential portion of the holder 6, and a flange portion 3a of the cup body 3 is fixed by crimping. Although in a portion of the reinforcing member 7 which contacts the flange portion 3a, a groove in a shape corresponding to the flange portion 3a is formed, production cost becomes high since forging and cutting is necessary in production of such a groove.

In JP-A 2002-172996, an igniter comprising a cup-shaped tube body 10, a transfer charge 15 contained in the tube body 10, a plug 7, a bridge wire 5 generating heat by electrification, and a fuse head 1 formed on the surface of the bridge wire 5 is disclosed. In the cup body 8, a stepped portion 9 is formed, a reinforcing member 26 and a flange 13 are engaged at this portion and crimped by a bent portion 30, and at the same time the stepped portion 9 is crimped ([0032]). Because of the existence of the bent portion and the stepped portion 9, the cup body 8 has an enlarged outside diameter at those portions. In combustion of a gas generating agent P, big pressure is generated in the cup body 8, and at this time, it is possible that the stepped portion 9 deforms radially outwardly by the pressure, connecting strength of the crimping portion decreases and parts scatters.

In JP-A 2001-106017, a gas generator comprising a charging tube body 1 charging a gas generating agent, a storing tube body 2 storing an ignition agent, and a holder 3 sealing the gas generating agent P and the ignition agent 6 is disclosed. The charging tube body 1 and the holder 3 are sealed by crimping of a crimping ring body 4. However, since the ring body 4 is pressed into the holder 3 axially, it is possible that, in the combustion of the gas generating agent P, the ring body 4 falls by the pressure generated inside the loading tube body 1. In addition, a connection by arranging a screw on an interior circumferential surface of the ring body 4 and an exterior circumferential surface of the holder 3, a method of coupling the ring body 4 to the holder 3 by a bolt et al., and so on are disclosed. But, these methods bring increase in the number of parts and processing cost.

DISCLOSURE OF THE INVENTION

An object of the present invention is to provide a gas generator which is easily assembled and is also applicable as an electric type igniter in addition to not requiring expensive cutting and being able to decrease production cost as a whole, and to provide a method of manufacturing thereof and a gas generator for an air bag using the above gas generator as an ignition means.

The invention of the claim 1 provides, as a means to solve the problem, a gas generator which is an ignition means comprising an igniter assembly containing an igniter main body having an ignition portion to be ignited by an ignition electric current and an igniter collar in a generally cylindrical shape which wraps and holds the outside of the igniter main body, and a cup body loaded with a gas generating agent inside and having an opening portion, wherein the igniter assembly and the cup body are connected such that at least the ignition portion of the igniter main body is wrapped in the cup body and the ignition portion and the gas generating agent are in contact, and at least a part of the exterior surface of the igniter collar and at least a part of the exterior surface of the cup body are connected and fastened from the outside by means of a tubular crimp case.

The gas generator in the invention of the claim 1 is also applicable as an electric ignition device of a gas generator for an air bag used in a vehicle occupant-restraint apparatus in a vehicle.

Conventionally, since, in connection of an igniter assembly (igniter collar) and a cup body, a method of connecting the cup body by crimping the igniter collar side has been applied, there is a need to form a groove in the igniter collar into which part of the cup body fits so that the crimping can be done. Because this groove has a narrow width and it is impossible to form a molded body including the groove by forging and press, after forming the igniter collar into a shape without a groove by forging, or press et al., expensive cutting has been done.

However, by providing a method of connecting and fastening using a tubular crimp case, there is no need of doing cutting to the igniter collar and only inexpensive processing method such as forging, press molding et al. is needed. So, even if considering a point that the number of parts increases by one, as a whole, it connects to decrease in production cost.

In "a gas generating agent" in the invention of claim 1, in addition to a gas generating agent for a gas generator used in winding a seat belt in a seat belt pretensioner and a solid gas generating agent generating a gas for air bag inflation used in a gas generator for air bag inflation, there are also included a transfer charge used to ignite and burn the solid gas generating agent, which has functions of enhancing flame, heat and so on generated by an actuation of the igniter and transferring the flame, heat and so on to a solid gas generating agent, that is a transferring function, and for which boron potassium nitrate and so on are generally used.

The invention of the claim 2 provides a gas generator of the above invention, wherein both or one (preferably both) of the upper end side and the lower end side of the opening circumferential edge portions of the crimp case installed from the outside of the igniter collar and the cup body are bent inwardly, and in the inside, the igniter collar and the cup body are connected and fastened.

The invention of the claim 3 provides a gas generator of the claim 2 above invention, wherein the cup body has a flange portion formed outwardly from the opening circumferential edge portion, and the cup body and the crimp case are connected and fastened by pressing the flange portion of the cup body with the upper end side of a bent portion of the crimp case.

By using a cup body having a flange portion and crimping at the flange portion, the connecting strength by the crimp case is increased more.

The invention of the claim 4 provides a gas generator of the claim 2 or 3, wherein the igniter collar and the crimp case are connected and fastened by pressing a flat surface portion of the igniter collar with the lower end side of a bent portion of the crimp case.

By arranging a flat surface portion in the igniter collar and by crimping at that portion, the connecting strength by the crimp case is increased more.

The invention of the claim 5 provides a gas generator of any one of the claims 1 to 4, wherein the igniter main body and the igniter collar in a generally cylindrical shape are integrated by resin.

The invention of the claim 6 provides a gas generator of the claim 5, wherein, in a portion of the igniter collar which contacts the resin, a means for preventing rotation of resin in the collar is arranged.

In integrating the igniter main body with the igniter collar in a generally cylindrical shape by resin, a method of integrating the igniter main body with the igniter collar by pouring a melted resin into the igniter collar in a generally cylindrical shape, and hardening the resin is applied. In integrating in this way, there is a fear that the resin hardened in the igniter collar rotates and the igniter main body turns. So, it is desirable to arrange a concave portion, a protrusion, or the like in a portion of the igniter collar which contacts the resin as a means for preventing rotation of the hardened resin.

The invention of the claim 7 provides a gas generator of any one of the claims 1 to 6, wherein the cup body has a fragile portion in at least one of a closed end surface and a circumferential wall surface.

In the cup body having a fragile portion, since the cup body becomes easily ruptured in the fragile portion, as a result of decreased pressure added to the crimp case, falling off and breakage of the crimp case are prevented. In addition, when used as an ignition device of a gas generator for a pretensioner and a gas generator for an air bag, each apparatus can be operated surely.

The invention of claim 8 provides, as another means to solve the problem, a gas generator for an air bag comprising, an ignition means, and a combustion chamber accommodating a gas generating agent ignited and burnt by the ignition means to generate a combustion gas for inflating an air bag, or a pressurized medium chamber loaded with a pressurized medium as a means to inflate an air bag, all accommodated in a housing having a gas discharging port, wherein the gas generator as claimed in any one of claims 1 to 7 is used as the ignition means.

By the way, the ignition means used in the gas generator for an air bag in the invention of claim 8 includes ones having different function depending on the type of the gas generator for an air bag as follows;
(i) An ignition means having a function of igniting and burning a gas generating agent for a gas generator which uses only a combustion gas generated by igniting and burning the gas generating agent as inflation medium of an air bag;
(ii) An ignition means having a function of igniting and burning a gas generating agent or an ignition means having a function of breaking a sealing rupture disk for sealing a pressurized medium for a hybrid inflator using a combustion gas together with a pressurized medium (helium, argon, nitrogen gas, and so on loaded under high pressure) as inflation medium of an air bag;
(iii) An ignition means having a function of breaking a sealing rupture disk for sealing a pressurized medium for an inflator using only a pressurized medium as inflation medium of an air bag.

The invention of claim 9 provides, as another means to solve the problem, a method of manufacturing a gas generator comprising a step of pressing an igniter collar in a generally cylindrical shape into a tubular crimp case, a step of installing an igniter main body to the igniter collar and obtaining an igniter assembly, a step of putting a cup body having a flange portion formed outwardly at an opening portion on the igniter main body, and a step of crimping an upper end side of the opening circumferential edge portion of the crimp case inwardly and pressing the flange portion of the cup body, together with crimping an lower end side of the opening circumferential edge portion inwardly and pressing the igniter collar.

The gas generator obtained by the method of manufacturing of the invention of claim 9 is also applicable as an electric ignition device of a gas generator for an air bag used in a vehicle occupant restraint apparatus in a vehicle.

The invention of the claim 10 provides a method of manufacturing a gas generator of the above invention, which comprises a step of pressing the igniter collar in a generally cylindrical shape into a tubular crimp case in a condition that the lower end side of the opening circumferential edge portion is bent inwardly.

The invention of the claim 11 provides a method of manufacturing a gas generator of the claim 9 or 10, wherein, in the step of obtaining an igniter assembly, the igniter collar and the igniter main body are integrated by resin.

In the method of manufacturing of the present invention, since assembly work of a gas generator becomes easy, and forging and press molding can be applied to manufacturing parts, production cost is also lowered.

The gas generator of the claims 1 and so on are especially suitable to a gas generator for a pretensioner, and the gas generator for an air bag of claim 8 is applicable to various types of gas generators such as for a driver side air bag, a front passenger side air bag, a air bag for a side collision, a curtain air bag, a knee bolster, a inflatable seat belt, a tubular system.

Because the assembly work of the gas generator of the present invention is easy, and further, to the igniter collar as one component, an expensive cutting is not used and an inexpensive forging or press molding only are applied, as a whole production, cost is decreased.

Figure 1:
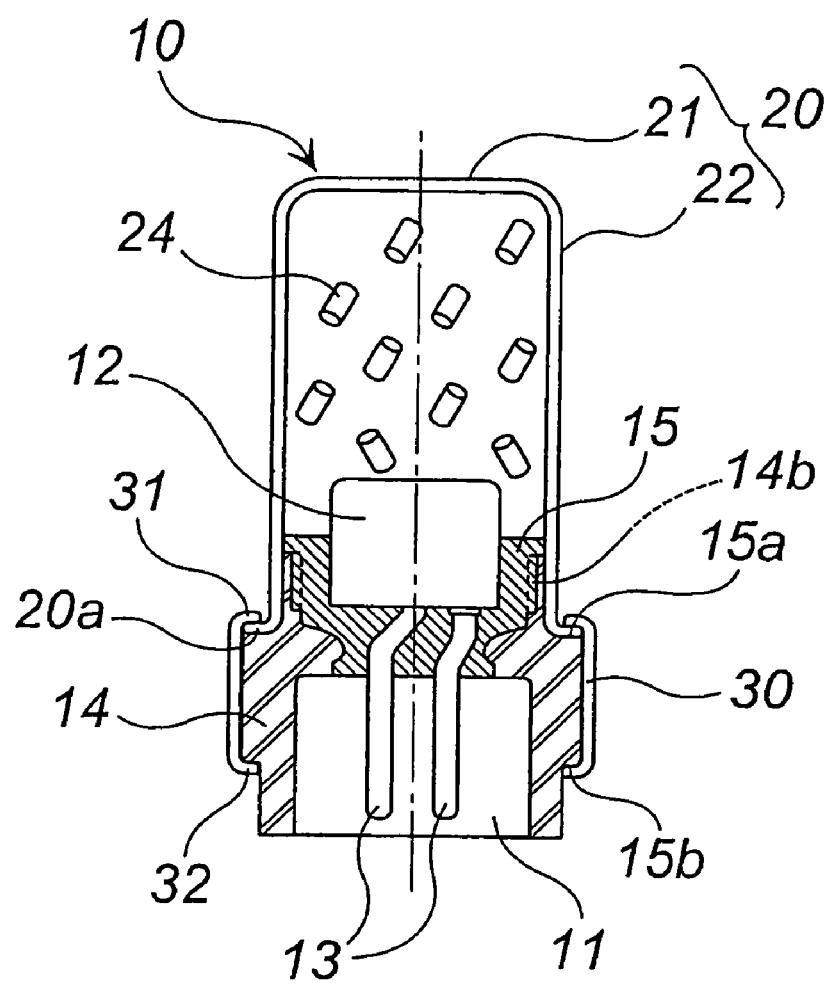
FIG. 1 is a vertical cross section of a gas generator.

DESCRIPTION OF THE NUMERALS 10 gas generator
12 igniter main body
14 igniter collar
15 resin portion
20 cup body
24 gas generating agent
30 crimp case

PREFERRED EMBODIMENTS OF THE INVENTION

(1) Embodiment 1

Embodiment 1 is explained by FIG. 1. FIG. 1 is an axial cross section of a gas generator. The gas generator 10 comprises a combination of an igniter assembly and a cup body 20.

The igniter assembly contains an igniter main body 12 having an ignition portion to be ignited by an ignition electric current, and an igniter collar 14 of generally cylindrical shape surrounding and holding outside of the igniter main body 12. The igniter collar 14 can be formed of a metal or resin.

The igniter main body 12 has two electroconductive pins 13 and the vertex becomes an ignition portion. A connector 11 is connected to the electroconductive pins 13, and the igniter main body 12 is connected to a power source via a lead wire extended from the connector 11.

The igniter collar 14 has a generally cylindrical shape, and it is used for surrounding and holding outside of the igniter main body 12. In the igniter collar 14, an upper flat circumferential edge 15a and an lower flat circumferential edge 15b are arranged across a side circumferential surface. In addition, in the igniter collar 14, a space corresponding to the external shape of the connector 11 is formed in order to fit and connect the connector 11 to the electroconductive pins 13.

The igniter main body 12 and the igniter collar 14 can be connected by making an outside shape of the igniter main body 12 and an inside shape of the igniter collar 14 identical with each other, and embedding and holding the igniter main body 12 into the igniter collar 14. However, since processing work needed to make both shapes identical is complicated and expensive, a method of pouring a melted resin into a space between the igniter main body 12 and the igniter collar 14 and hardening the same (the resin portion 15) (a method of integrating the igniter main body 12 with the igniter collar 14 by resin 15) is desirable. This method is disclosed in the paragraph number 181 and FIG. 24 of JP-A 2001-97176, and so on.

The cup body 20 has an opening portion in the igniter main body 12 side, has a flange portion 20a formed outwardly from the opening circumferential edge portion and is loaded with a required amount of a gas generating agent 24 inside. The cup body 20 can be formed of a metal such as aluminum. As described above, the gas generating agent 24 may have a function as a transfer charge.

The cup body 20 is put such that the ignition portion of the igniter main body 12 is enclosed in the inside of the cup body 20 and the ignition portion is in contact with the gas generating agent 24. The flange portion 20a of the cup body 20 is abuts against the upper flat circumferential edge 15a of the igniter collar 14.

It is desirable that the cup body 20 has a fragile portion in at least one of a closed end surface 21 and a circumferential wall surface 22. When a gas generator 10 is actuated, the cup body 20 is broken in the fragile portion and a combustion gas is released from the broken portion, whereby, this fragile portion acts such that the pressure added to the crimp case 30 is decreased, breakage and falling off of the crimp case 30 are also prevented, and falling off of the cup body 20 et al. is prevented. In addition, when used as an igniter of a gas generator for a pretensioner and a gas generator for an air bag, each apparatus can be operated surely.

The exterior surface including a connection portion of the igniter collar 14 and the cup body 20 is connected and fastened by a tubular crimp case 30 from outside. The crimp case 30 can be formed of metal such as aluminum, stainless, iron, and so on.

Figure 4:
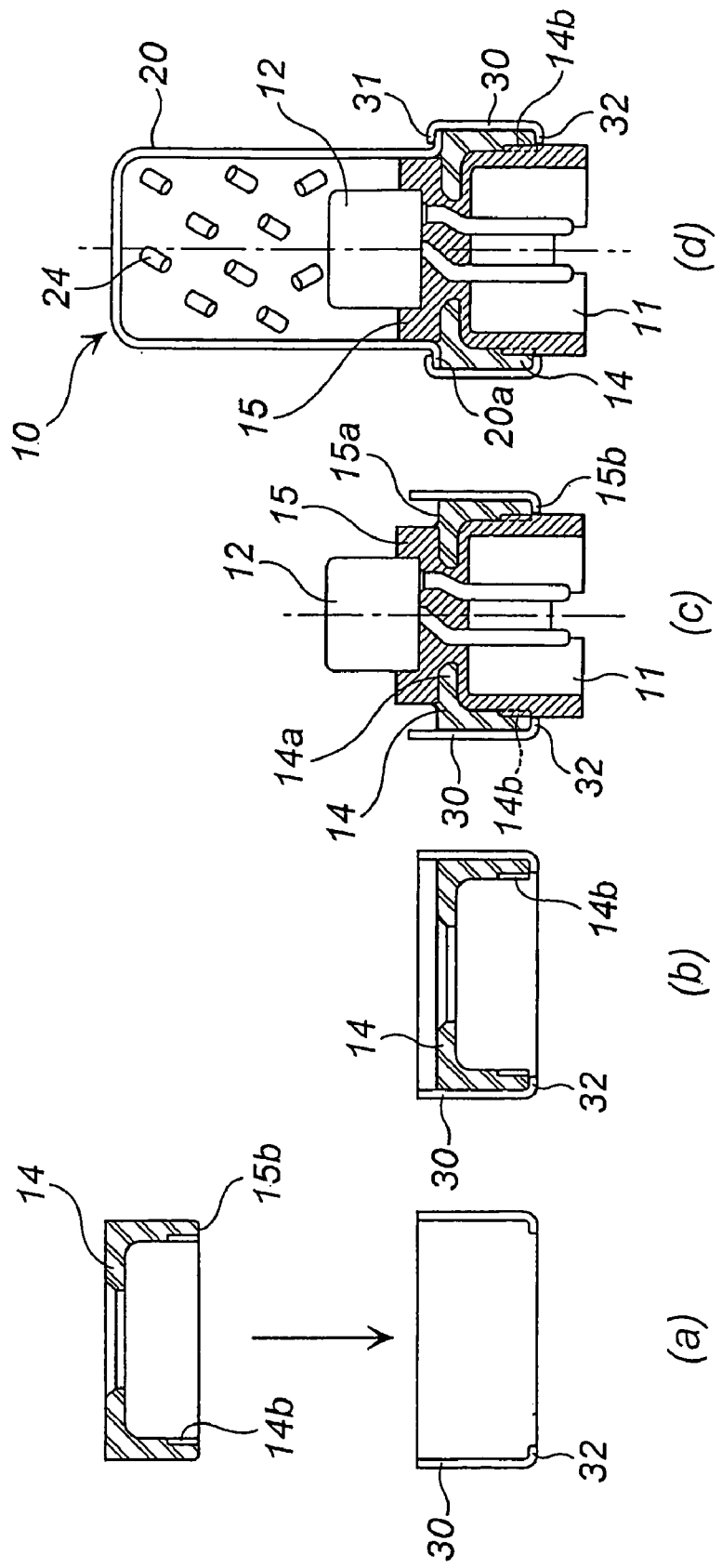
FIG. 4 is an explanatory drawing of a method of manufacturing a gas generator.

In a portion of the interior circumferential surface of the igniter collar 14 which contacts the resin portion 15, a concave portion 14b for rotation prevention of resin portion 15 is formed (cf. FIG. 4 (a), (b)). By forming this concave portion 14b, it is prevented that the resin portion 15 rotates in the igniter collar 14 and pins 13 turn. As a rotation preventing means of the resin portion 15, instead of the concave portion 14b, a protrusion can be arranged, or a means of polygonal or oval interior circumferential surface of the igniter collar 14 which contacts the resin portion 15 can be applied.

The igniter collar 14 and the cup body 20 are connected and fastened by the crimp case 30 by pressing a joining portion of the upper flat circumferential edge 15a and the flange portion 20a with the upper end side 31 of a bent portion of the crimp case 30, and by pressing the lower flat circumferential edge 15b of the igniter collar 14 with the lower end side 32 of the bent portion of the crimp case 30.

By connecting and fastening the igniter collar 14 and the cup body 20 using such a crimp case 30, there is no need of doing expensive cutting to the igniter collar 14 and inexpensive processing method such as forging, press-molding et al. is enough. So, even though the number of parts increases by one by using a crimp case, as a whole it connects to decrease in production cost.

(2) Embodiment 2

Figure 2:
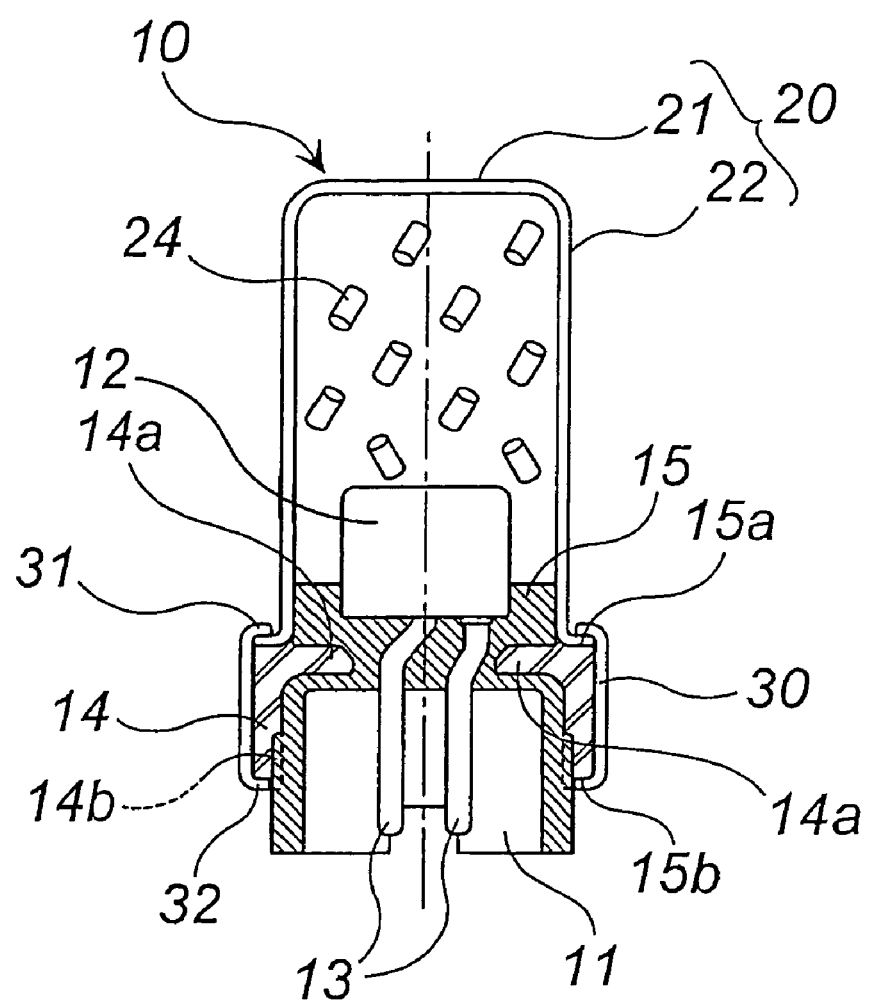
FIG. 2 is a vertical cross section of a gas generator of another embodiment.

Embodiment 2 is explained by FIG. 2. FIG. 2 is an axial cross section of a gas generator of another embodiment.

Since the gas generator 10 of FIG. 2 is completely the same as the gas generator 10 of FIG. 1 except that a shape of the igniter collar 14 is different and necessarily the shape of the resin portion 15 is different, only different portions are explained.

The igniter collar 14 has a protrusion 14a elongated inwardly compared with that of FIG. 1, and the shape of the resin portion 15 existing between the igniter main body 12 and the igniter collar 14 is different from that of FIG. 1. Furthermore, location of forming the concave portion 14b for rotation prevention of the resin portion 15 shown in FIG. 1 is also different.

When pouring a melted resin into a space between the igniter main body 12 and the igniter collar 14 and hardening it, the resin shrinks with hardening. At this time, since the resin shrinks in a way of clipping the protrusion 14a from above and below, compared with a case of a flat interior circumferential surface such as a tubular igniter collar, a space between the interior circumferential surface of the igniter collar 14 and the resin portion 15 is hardly generated. Accordingly, the resin portion 15 does not fall off from the igniter collar 14 even after hardening of the resin.

When a space is generated between the interior circumferential surface of the igniter collar 14 and the resin portion 15, it is possible that "short pass phenomenon" in which a combustion gas passes through the space and leaks, or moisture penetration phenomenon from the outside atmosphere occurs and so desired ability is not obtained. Although a separate sealing by a sealing means becomes necessary to prevent these phenomena, by using the igniter collar 14 having a protrusion 14*a* shown in FIG. 2., short pass phenomenon and moisture penetration phenomenon are prevented.

By the way, in the gas generator 10 shown in FIG. 1, the same effect as one shown in FIG. 2 is also obtained, since a protrusion is arranged in the igniter collar 14. However, the effect is enhanced more by that the protrusion 14*a* in one shown in FIG. 2 is longer.

(3) Embodiment 3

Figure 3:
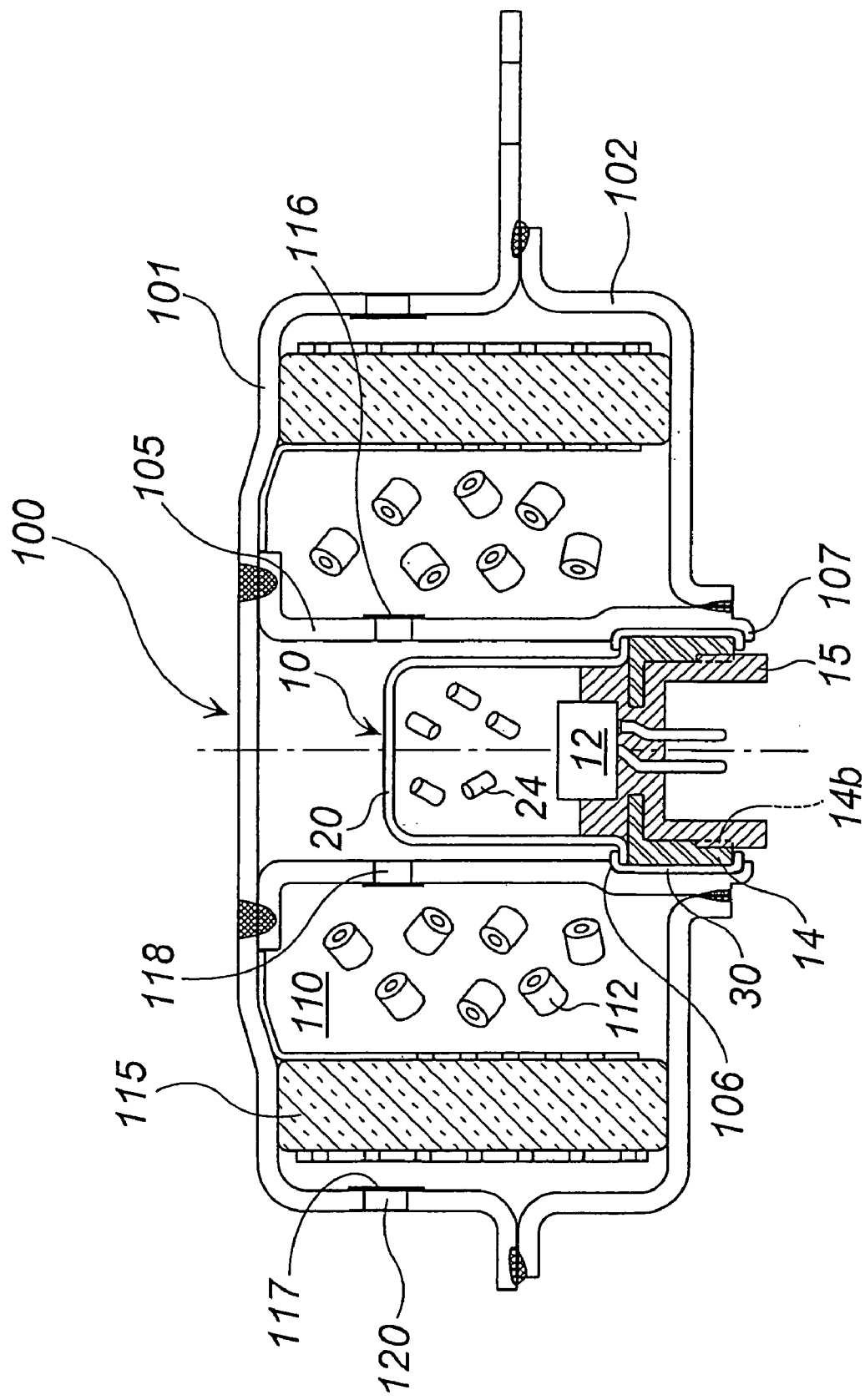
FIG. 3 is a vertical cross section of a gas generator for an air bag.

An embodiment of a gas generator for an air bag is explained by FIG. 3. FIG. 3 is an axial cross section of a gas generator for an air bag 100 in which a gas generator 10 shown in FIG. 2 is installed as an ignition means. In stead of the gas generator 10 shown in FIG. 2, the gas generator 10 shown in FIG. 1 can be used.

In a housing comprising a diffuser shell 101 and a closure shell 102, an inner cylinder 105 is disposed.

Outside the inner cylinder 105, a circular combustion chamber 110 is arranged and a required amount of gas generating agent 112 is loaded. The gas generating agent 112 is ignited and burnt to generate a combustion gas as an inflation medium of an air bag.

Inside the inner cylinder 105, the gas generator 10 shown in FIG. 2 as is installed as an ignition means. The gas generator 10 is fastened by abutting the upper end side 31 of the bent portion of the crimp case 30 against a notch portion 106 of the inner cylinder 105, and by crimping the lower end side 32 of the bent portion by a crimping portion 107.

When the gas generator 10 is actuated, by action of a high-temperature gas, a flame and so on generated by combustion of the gas generating agent 24, the cup body 20 is ruptured (when a fragile portion is arranged, it is ruptured at the fragile portion), and the combustion gas, the flame and so on are released into the inner cylinder 105. At this time, since the igniter collar 14 and the cup body 20 are connected tightly by the crimp case 30, the cup body 20 does not falls off from the ignition collar 14 by the pressure increased by a combustion of the gas generating agent 24.

After that, the combustion gas, the flame and so on rupture a seal tape 116, flow from through-holes 118 into the combustion chamber 110, and ignite and burn the gas generating agent 112. The combustion gas generated by combustion of the gas generating agent 112 goes through a coolant/filter 115. Then, it ruptures a seal tape 117, and is released from a gas discharging port 120 to inflate an air bag.

By the way, the gas generating agent 24 disposed in the gas generator 10 used as an igniter in this embodiment burns by an actuation of an igniter main body 12 and functions as a conventional transfer charge (boron potassium nitrate, for example) generating a high-temperature combustion gas, a flame and so on, but this gas generating agent 24 can be replaced by a conventional transfer charge as it is, or can be mixed with a conventional transfer charge. Further, if the gas generating agent 24 is of a composition that generates a high-temperature gas, the gas can be used as a gas for air bag inflation.

(4) Embodiment 4

A method of manufacturing a gas generator is explained by FIG. 4. FIG. 4 is a process chart of (*a*) to (*d*) for explaining a method of manufacturing the gas generator 10 shown in FIG. 2.

FIG. 4 (*a*) is a drawing showing a process of press-fitting the igniter collar 14 into the crimp case 30. By the way, the igniter collar 14 was forged into a shape shown in the drawing.

In the crimp case 30, a lower end side 32 of the bent portion is formed beforehand. By forming such a lower end side 32 of the bent portion, it becomes easy to decide a position for press-fitting the igniter collar 14 into the crimp case 30, that is, to decide the extent to which the igniter collar 14 is pressed into the crimp case 30.

The outside diameter of the igniter collar 14 and the inside diameter of the crimp case 30 are formed with tolerance enabling the pressing operation.

FIG. 4 (*b*) is a drawing showing a state in which the igniter collar 14 is pressed into the crimp case 30.

The lower end side 32 of the bent portion of the crimp case 30 is abutted against the lower flat circumferential edge 15*b* of the igniter collar 14. At this time, the lower flat circumferential edge 15*b* is not pressed by the lower end side 32 of the bent portion.

FIG. 4 (*c*) shows a process for obtaining an igniter assembly by installing the igniter main body 12 to the igniter collar 14.

By applying a method disclosed in the paragraph number 181 and FIG. 24 of JP-A 2001-97176 and so on, after pouring a melted resin into a space between the igniter main body 12 and the igniter collar 14 with using a suitable mold, a resin portion 15 is formed by hardening. The operation of the protrusion 14*a* and the concave 14*b* for rotation prevention are as described above. By this operation, the igniter assembly is obtained.

FIG. 4 (*d*) shows a process for installing the cup body 20 and then connecting and fastening the igniter collar 14 with the cup body 20 by the crimp case 30.

Because a required amount of the gas generating agent 24 is loaded in the cup body 20 (as to the loaded amount of the gas generating agent 24, it is also considered that part of the igniter main body 12 goes into the cup body 10), the cup body 20 is put with a state in which the opening of the cup body 20 is set above, that is, FIG. 4(*d*) is set upside down. At this time, the cup body 20 is put such that the flange portion 20*a* of the cup body 20 abuts against the upper flat circumferential edge 15*a* of the igniter collar 14.

Afterward, the flange portion 20*a* of the cup body 20 is pressed by crimping the crimp case 30 such that an upper end side 31 of a bent portion is formed. Then, by a generation of pressing force of the upper end side 31 of a bent portion to the flange portion 20*a*, the lower flat circumferential edge 15*b* is pressed by the lower end side 32 of the bent portion.

As stated above, by using the crimp case 30, since the connecting and fastening work of the igniter collar 14 with the cup body 20 becomes easy, and forging or press-molding only is enough as a means for processing the igniter collar 14, production cost is decreased.

The invention claimed is:

1. A gas generator, comprising:
   an igniter assembly including an igniter main body having an ignition portion adapted to be ignited by an ignition electric current;

an igniter collar which accommodates the igniter main body;

a cup body having an opening portion, the igniter assembly and the cup body being connected to each other, such that at least the ignition portion of the igniter main body is surrounded by the cup body;

a gas generating agent accommodated inside the cup body, and a tubular crimp case having an upper end and a lower end, the tubular crimp case connecting and fastening the cup body to the igniter collar by bending the upper end of the tubular crimp case towards the igniter collar, such that a first bent portion formed at the upper end of the tubular crimp case presses a part of the cup body against a part of an exterior surface of the igniter collar.

2. The gas generator as claimed in claim 1, wherein the first bent portion is formed by bending the upper end of the tubular crimp case inwardly towards the igniter collar.

3. The gas generator as claimed in claim 1, wherein the cup body has a flange portion formed outwardly at the opening portion, and the cup body and the igniter collar are connected and fastened by pressing a part of the flange portion of the cup body against a part of the exterior surface of the igniter collar by the first bent portion.

4. The gas generator as claimed in claim 1, wherein the tubular crimp case has a second bent portion formed at the lower end of the tubular crimp case, and the igniter collar and the tubular crimp case are connected and fastened by pressing a part of an exterior surface portion of the igniter collar against a part of an interior surface of the second bent portion.

5. The gas generator as claimed in claim 1, further comprising:

a resin for integrating the igniter main body and the igniter collar.

6. The gas generator as claimed in claim 5, wherein, the igniter collar is provided with means for preventing rotation of the resin against the igniter collar.

7. The gas generator as claimed in claim 1, wherein the cup body has a fragile portion in at least one of a closed end surface and a circumferential wall surface.

8. A gas generator for an air bag comprising:

a housing provided with a gas discharging port;

the gas generator as claimed in claim 1 provided inside the housing as ignition means;

at least one of a combustion chamber and a pressurized medium chamber provided inside the housing, the combustion chamber accommodating a gas generating agent ignited and burnt by the ignition means to generate a combustion gas for inflating an air bag, and the pressurized medium chamber accommodating a pressurized medium for inflating the air bag.

9. A method of manufacturing a gas generator, comprising:

placing an igniter collar, generally cylindrical in shape, into a tubular crimp case;

installing an igniter main body to the igniter collar to form an igniter assembly;

placing a cup body having a flange portion formed outwardly at an opening portion over the igniter main body;

crimping an upper end of the tubular crimp case inwardly and pressing the flange portion of the cup body against the igniter collar; and crimping a lower end of the tubular crimp case inwardly and pressing the lower end against the igniter collar.

10. The method of manufacturing a gas generator as claimed in claim 9, further comprising:

placing the igniter collar into the tubular crimp case after bending the lower end inwardly.

11. The method of manufacturing a gas generator as claimed in claim 9 or 10, further comprising:

integrating the igniter collar and the igniter main body by resin after the installing step.

12. A method of manufacturing a gas generator, comprising:

placing an igniter collar, generally cylindrical in shape, into a tubular crimp case having a bent portion formed inwardly at a lower end of the tubular crimp case from an upper end of the tubular crimp case;

installing an igniter main body to the igniter collar to form an igniter assembly;

placing a cup body having a flange portion formed outwardly at an opening portion over the ignition main body;

crimping the upper end of the tubular crimp case inwardly and pressing the flange portion of the cup body against the igniter collar; and pressing the igniter collar against the bent portion of the tubular crimp case by pressing the flange portion against the igniter collar.

13. The method of manufacturing a gas generator as claimed in claim 12, further comprising:

integrating the igniter collar and the igniter main body by resin after the installing step.

14. The method of manufacturing a gas generator as claimed in claim 9 or 12, further comprising:

placing a gas generating agent in the cup body prior to the cup body placing step.

15. The method of manufacturing a gas generator as claimed in claim 9 or 12, further comprising:

turning the igniter collar upside down prior to the cup body placing step, such that the cup body placing step is executed while the opening portion of the cup body faces upward.

16. The method of manufacturing a gas generator as claimed in claim 9 or 12, wherein the cup body placing step includes the step of placing the flange on an upper flat circumferential edge of the igniter collar.

* * * * *